United States Patent [19]
Suzuki et al.

[11] Patent Number: 5,296,679
[45] Date of Patent: Mar. 22, 1994

[54] METHOD AND APPARATUS FOR FUSION SPLICING OPTICAL FIBERS

[75] Inventors: Isao Suzuki, Sakura; Hiroyuki Kawasaki, Chiba; Michio Morooka, Katori; Mikio Yoshinuma, Yachiyo, all of Japan

[73] Assignee: Fujikura Ltd., Tokyo, Japan

[21] Appl. No.: 104,540

[22] Filed: Aug. 11, 1993

[30] Foreign Application Priority Data

Aug. 12, 1992 [JP] Japan ............................... 4-236418

[51] Int. Cl.⁵ ............................................ G02B 6/255
[52] U.S. Cl. ..................................... 219/383; 385/96
[58] Field of Search .................. 219/68, 383; 385/96; 65/4.1, 4.2

[56] References Cited

U.S. PATENT DOCUMENTS

| | | | |
|---|---|---|---|
| 5,085,493 | 2/1992 | Zell et al. ............................. | 385/96 |
| 5,122,638 | 6/1992 | Sato et al. ............................ | 219/383 |
| 5,228,102 | 7/1993 | Sato et al. ............................ | 385/96 |

FOREIGN PATENT DOCUMENTS

| | | | |
|---|---|---|---|
| 69832 | 1/1983 | European Pat. Off. ............... | 65/4.2 |
| 58-203407 | 11/1983 | Japan .................................... | 385/96 |
| 63-106706 | 5/1988 | Japan . | |

Primary Examiner—Geoffrey S. Evans
Attorney, Agent, or Firm—Cushman, Darby & Cushman

[57] ABSTRACT

A method of fusion splicing optical fibers. Cores of the optical fibers to be fusion spliced are arranged in such a manner that the ends of the corresponding cores of optical fibers opposingly face to each other between discharge electrodes for fusion splicing. Discharge current flowing between the discharge electrodes is automatically adjusted according to a number of the cores of the optical fibers to substantially provide an optimal correction to the discharge current in relation to the number of the cores of the optical fibers. The discharge current is further adjusted to a variation in atmospheric pressure to substantially provide an optimal correction to the discharge current in relation to the variation in atmospheric pressure.

8 Claims, 7 Drawing Sheets

Atmospheric Pressure Data

METHOD AND APPARATUS FOR FUSION SPLICING OPTICAL FIBERS

BACKGROUND OF THE INVENTION

The present invention relates to a method for fusion splicing optical fibers in a batchwise manner, and further relates to an apparatus for use in practicing the method. The batch fusion splicer is capable of performing batch fusion splicing in multimode for connecting multicore fibers, such as single, double, 4, 8, 10, and 12 core fibers.

The discharge power which is a heat source of splicing depends upon a variation in atmospheric pressure. The discharge power becomes smaller as the atmospheric pressure lowers at a constant discharge current. In an earlier attempt it has been proposed that: a variation in atmospheric pressure is detected and feedbacked to correct the discharge power according to the variation, so that the discharge current changes to produce a constant discharge power (see Japanese unexamined patent publication No. 63-106,706 and U.S. Pat. No. 5,122,638, for example).

The earlier attempt is briefly illustrated in FIG. 3, in which a voltage of a d.c. power source 10 is changed to a necessary high-frequency voltage through a dropper circuit 12, a chopper 14, and a step-up transformer 16, and thereby discharges take place at electrodes 18. The discharge current is detected by a resistance 20. The detected discharge current is feedbacked to the dropper circuit 12. These elements constitute a discharge control unit 22. In this attempt, an output of the pressure sensor 24 is provided to a microprocessor 26. The amount of feedback to the dropper circuit 12 is corrected in the microprocessor 26 on the basis of the output of the pressure sensor 24: when the atmospheric pressure becomes lower, the discharge power decreases, and therefore a correction is made to increase the discharge power.

In the prior art, the correction amount of the discharge power to a variation of atmospheric pressure cannot be, however, changed according to the number of fiber cores. When the correction amount is adjusted for 12 core fibers, for example, it is not appropriate for other fibers different in the number of cores. The correction amount can be excessively large for 4 core fibers.

Therefore, the correction amount is set to an intermediate value of the correction amounts of the all kinds of the fibers generally used. This setting is time consuming. Furthermore, the intermediate value does not produce sufficient results. More specifically, as illustrated in FIG. 4, the amount of correction for providing an appropriate discharge power is different for each number of cores, and in the case illustrated in FIG. 4 the amount of correction is set to that of the 8 core fibers which is intermediate. Considerable splice losses are produced for the other kinds of optical fibers.

SUMMARY OF THE INVENTION

Accordingly, it is an object of the present invention to provide a method for fusion splicing multicore optical fibers which method is capable of automatically optimizing the amount of correction of discharge power to the number of cores of optical fibers to be fusion spliced, so that fusion splicing is achieved at a low splice loss with ease.

Another object of the present invention is to provide an apparatus for use in practicing the method.

In view of these and other objects, a first aspect of the present invention is directed to a method of fusion splicing optical fibers, comprising the steps of: arranging cores of the optical fibers, including ends to be fusion spliced, in such a manner that the ends of the corresponding cores of optical fibers opposingly face to each other between discharge electrodes for fusion splicing; automatically adjusting discharge current flowing between the discharge electrodes according to a number of the cores of the optical fibers to substantially provide an optimal correction to the discharge current in relation to the number of the cores of the optical fibers; further adjusting the discharge current to a variation in atmospheric pressure to substantially provide an optimal correction to the discharge current in relation to the variation in atmospheric pressure.

According to a second aspect of the present invention, there is provided a method of fusion splicing optical fibers, comprising the steps of: arranging cores of the optical fibers, including ends to be fusion spliced, in such a manner that the ends of the corresponding cores of optical fibers opposingly face to each other between discharge electrodes for fusion splicing; inputting an atmospheric pressure signal representing a surrounding atmospheric pressure; inputting a splice condition signal representing a number of the cores of the optical fibers; and automatically correcting a discharge condition in the discharge electrodes according to both the atmospheric pressure signal and the splice condition signal to substantially provide an optimal correction to the discharges in relation to the atmospheric pressure and the number of the cores of the optical fibers.

According to this aspect of the present invention, discharges take place so that splice conditions, such as splice loss and splice strength, of the optical fibers become optimal. The discharge condition may include discharge current, discharge electrode voltage, discharge time, etc.

A third aspect of the present invention is directed to a method of fusion splicing optical fibers in which cores of the optical fibers, including ends to be fusion spliced, are arranged in such a manner that the ends of the corresponding cores of optical fibers opposingly face to each other between discharge electrodes for fusion splicing; and the discharge condition of the discharge electrodes is automatically corrected on the basis of an atmospheric pressure signal representing a surrounding atmospheric pressure, the atmospheric pressure signal being provided from an atmospheric pressure sensor. The method comprises the steps of: inputting a splice condition signal representing a number of the cores of the optical fibers; and automatically correcting a discharge condition in the discharge electrodes according to the splice condition signal to substantially provide an optimal correction to the discharge in relation to the number of the cores of the optical fibers.

A fourth aspect of the present invention is directed to a method of fusion splicing optical fibers, comprising the steps of: arranging cores of the optical fibers, including ends to be fusion spliced, in such a manner that the ends of the corresponding cores of optical fibers opposingly face to each other between discharge electrodes for fusion splicing; inputting a splice condition signal representing a number of the cores of the optical fibers; inputting an atmospheric pressure signal representing a surrounding atmospheric pressure; automatically adjusting discharge power in the discharge electrodes according to the splice condition signal to substantially provide an optimal correction to the discharge power in relation to the number of the cores of the optical fibers; and further adjusting the discharge power to a variation in atmospheric pressure to substantially maintain a constant discharge power in relation to the variation in atmospheric pressure.

In this aspect of the present invention, the discharge power is varied according to the number of cores to be fusion spliced while maintained stable to variations in atmospheric pressure.

According to a fifth aspect of the present invention there is provided an optical fiber fusion splicer, comprising: atmospheric pressure detection means for detecting a surrounding atmospheric pressure to produce an atmospheric pressure signal representing the surrounding atmospheric pressure; inputting means for inputting at least a number of cores of optical fibers to be fusion spliced to provide a splice condition signal representing the number of the cores of the optical fibers; discharge control means for controlling discharges between discharge electrodes, the cores of the optical fibers being placed between the discharge electrodes for fusion splicing; and data processing means for producing a correction discharge control signal on the basis of both the splice condition signal and the atmospheric pressure signal for substantially performing an optimal correction in the fusion splicing to the discharges, and outputting the correction discharge control signal to the discharge control means.

DETAILED DESCRIPTION OF THE PREFERRED EMBODIMENTS

Figure 1:
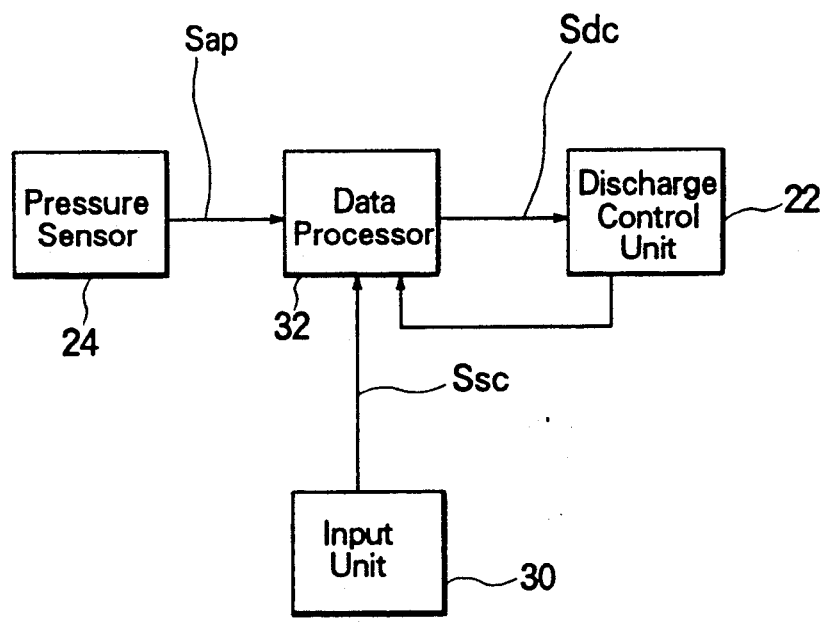
FIG. 1 is a block diagram illustrating one embodiment of the present invention.

A fusion splicer according to the present invention is generally illustrated in FIG. 1, and includes an pressure sensor 24 for detecting atmospheric pressure, a data processor 32, an input unit 30 for inputting at least the number of optical fibers to be fusion spliced, and a discharge control unit 22. The pressure sensor 24 outputs an atmospheric pressure signal Sap representing the surrounding atmospheric pressure to the data processor 32 while the input unit 30 outputs a splice condition signal Ssc to the data processor 32. The data processor 32 produces a discharge control signal Sdc on the basis of the atmospheric pressure signal Sap and the splice condition signal Ssc and provides the discharge control signal Sdc to the discharge control unit 22. Although the data processing is digitally performed using a microprocessor, it may be conducted using an analog system.

One embodiment of the present invention in which digital processing is performed will be described hereinafter.

In the digital processing, an atmospheric pressure signal Sap from the pressure sensor 24 is digitally converted by an A/D converter (not shown), and the resulting signal is provided to the data processor 32 which includes a central processing unit (CPU). The data processor 32 also accepts various kinds of data of the optical fibers to be fusion spliced as the splice condition signal Ssc.

In the data processor 32, the atmospheric pressure signal Sap and the splice condition signal Ssc are processed to provide a discharge control signal Sdc which represents optimal splice conditions, the discharge control signal Sdc is sent to the discharge control unit 22, in which discharge current is controlled to increase or decrease according to the discharge control signal Sdc.

The data processor 32 according to the present invention may be provided with a read only memory (ROM), which has a system program, and a random access memory (RAM) for storing information temporary inputted and an application program of the fusion splicing.

The fusion splicing of FIG. 1 will be more specifically described with reference to FIG. 2.

The pressure sensor 24 includes an atmospheric pressure sensor (not shown), for example, which outputs the atmospheric pressure signal Sap. The atmospheric pressure signal Sap is amplified and is then provided to the data processor 32 through the A/D converter not shown. The data processor 32 is provided with a microprocessor 34 and a correction amount determining unit 35 which will be described later.

Figure 4:
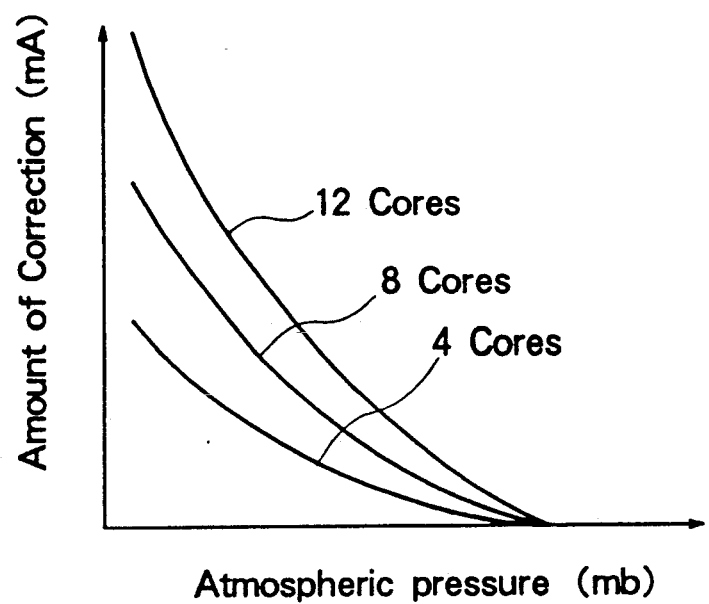
FIG. 4 is a graph illustrating that the amount of correction according to atmospheric pressure varies according to the number of cores.

In the microprocessor 34, splice condition data is previously inputted as core number information from the input unit 30. The input mode may includes single, double, 4, 6, 8, 10, or 12 core mode. Therefore, the microprocessor 34 stores a program for producing appropriate amounts of correction to variations in atmospheric pressure, as shown in FIG. 4, for each mode.

Figure 2:
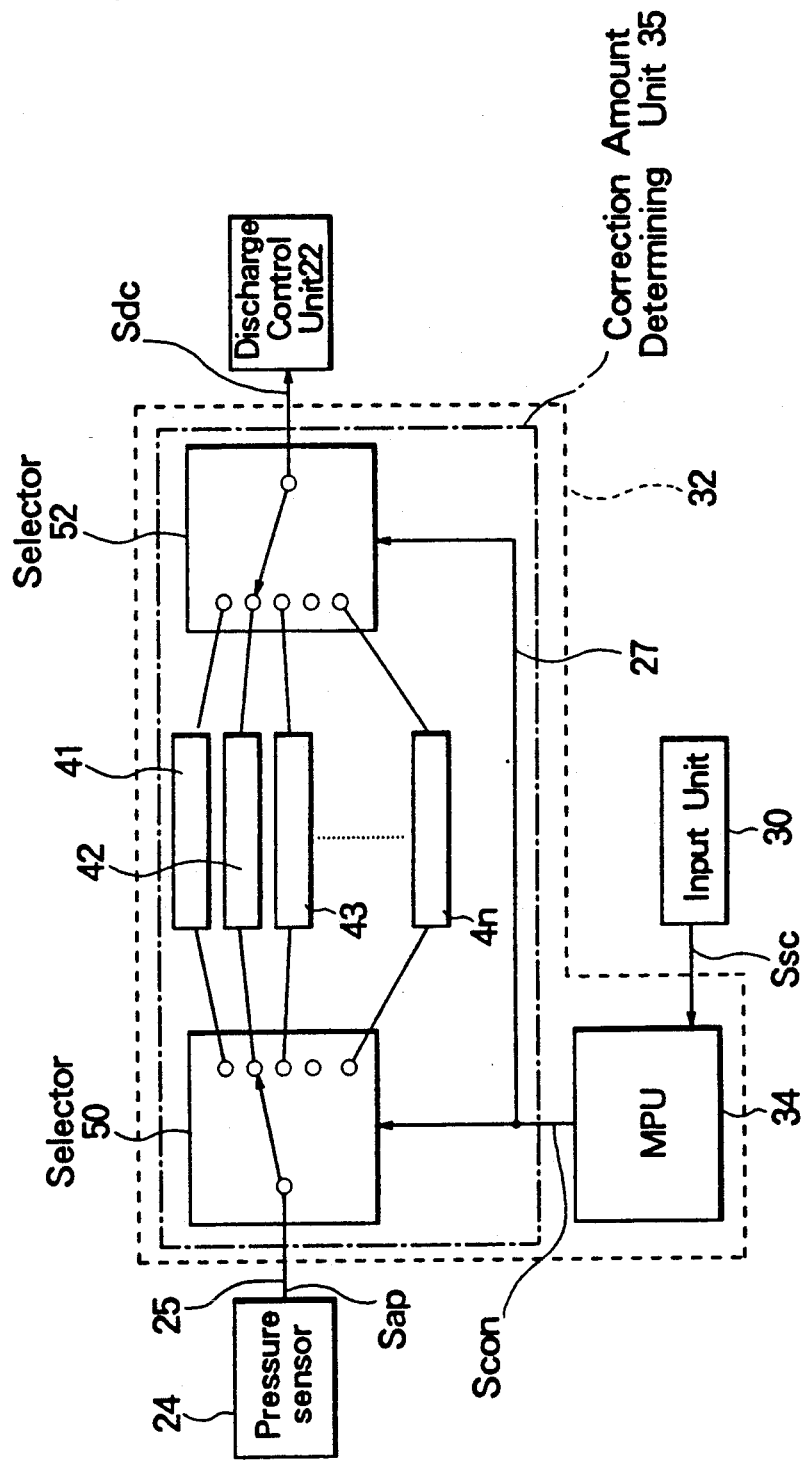
FIG. 2 is a block diagram showing the embodiment in a more specific configuration.

As shown in FIG. 2, the correction amount determining unit 35 includes correction amount determining circuits 41, 42, 43, ... , 4n, which correspond to core number modes including single, double, 4, 6, 8, 12, ... core modes, and selectors 50 and 52 which select one of the correction amount determining circuits 41, 42, 43, . . . , 4n. The correction amount determining circuits 41, 42, 43, . . . , 4n may be resistors and the selectors 50 and 52 may be relays. A more detailed description is given in Japanese (examined) Patent Publication 4-42643, and is hence omitted. The selectors 50 and 52 appropriately function to switch the correction amount determining circuits 41, 42, 43, . . . , 4n according to an atmospheric pressure signal Sap from the pressure sensor 24. When on the other hand, a number of cores is inputted from the input unit 30, the selectors 50 and 52 simultaneously switched according to a control signal Scon from the microprocessor 34, and therefore a correction amount determining circuit is selected. In this manner, a discharge control signal Sdc representing an appropriate correction amount according to both the number of cores to be fusion spliced and the atmospheric pressure is generated.

The input unit 30 may include a keyboard, from which a splice condition signal Ssc is inputted. The splice condition signal Ssc may include the number of fiber cores to be fusion spliced, the kind of optical fibers, data of input mode, etc.

Figure 3:
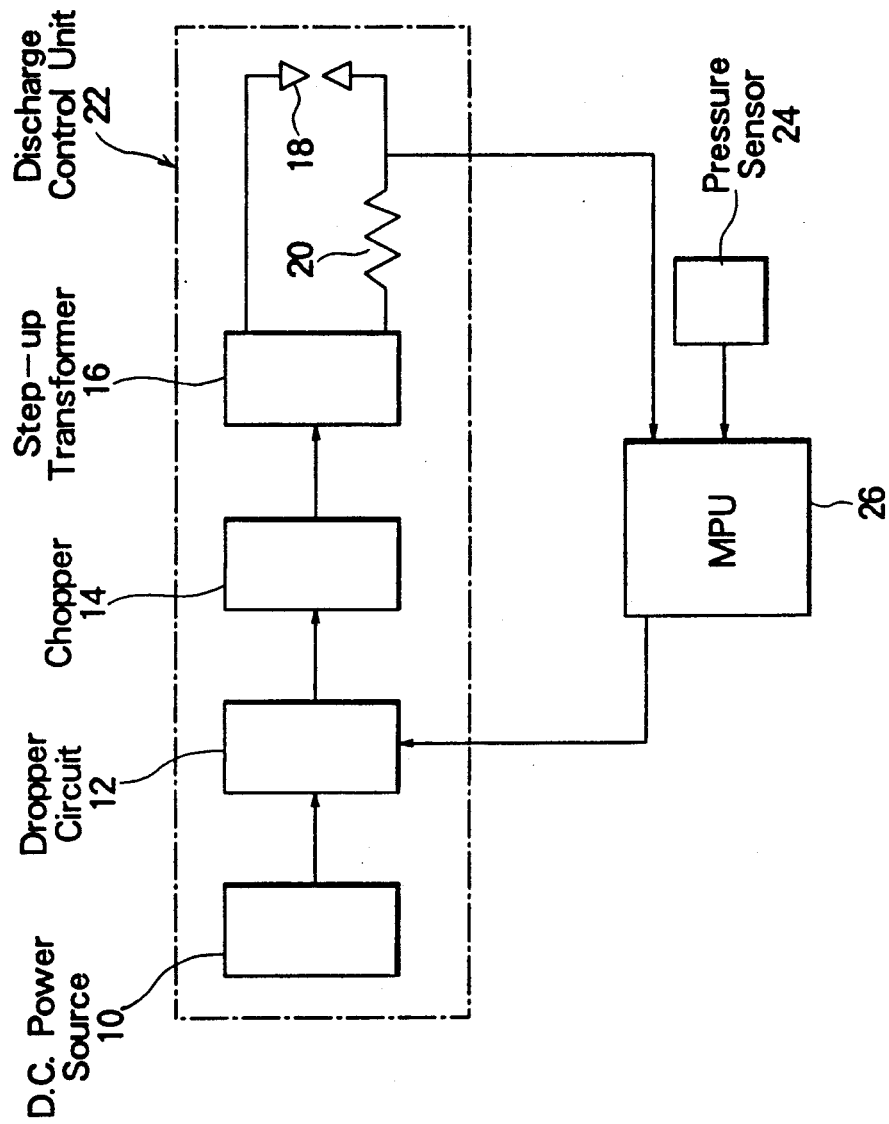
FIG. 3 is a block diagram showing the conventional fusion splicer.

The discharge control unit 22 has such a configuration as illustrated in FIG. 3, and has a function to control discharge conditions, particularly discharge current, according to a discharge control signal Sdc.

The table 1 gives experimental results showing optimal amounts of correction to discharge power according to variations in atmospheric pressure (altitude) for several numbers of cores of single mode fibers. The amounts of correction are given in scale of the panel of the fusion splicer used. One division P1 was substantially equal to 0.5 mA: that is, P2, P3 and P4 1.0, 1.5 and 2.0 mA, respectively.

TABLE 1

| Number of cores | Amounts of correction | | | |
|---|---|---|---|---|
| | 0 m | 1000 m | 2000 m | 3000 m |
| 1 | P7 | P2 | P4 | P7 |
| 2 | P8 | P2 | P5 | P8 |
| 4 | P14 | P2 | P4 | P7 |
| 6 | P16 | P3 | P6 | P9 |
| 8 | P18 | P4 | P7 | P10 |
| 10 | P21 | P3 | P6 | P9 |
| 12 | P21 | P4 | P7 | P10 |

Figure 5:
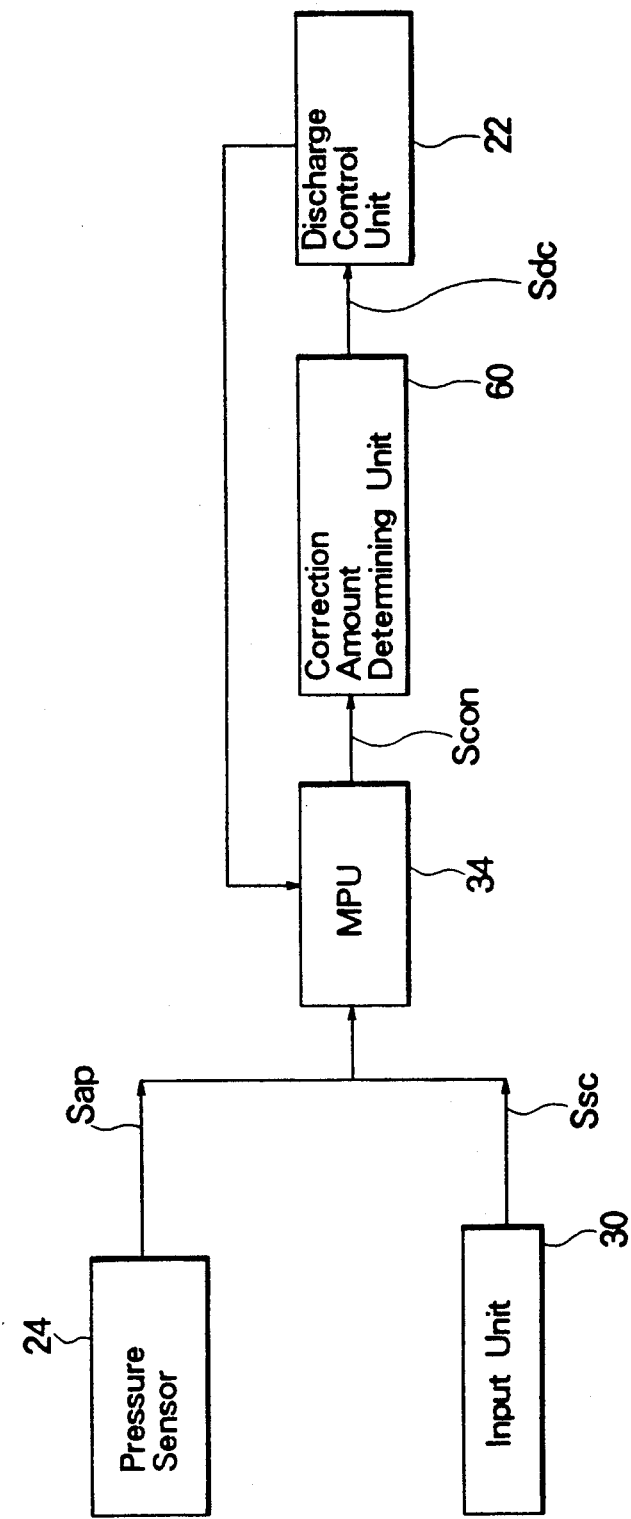
FIG. 5 is a block diagram illustrating another embodiment of the present invention.
Figure 6:
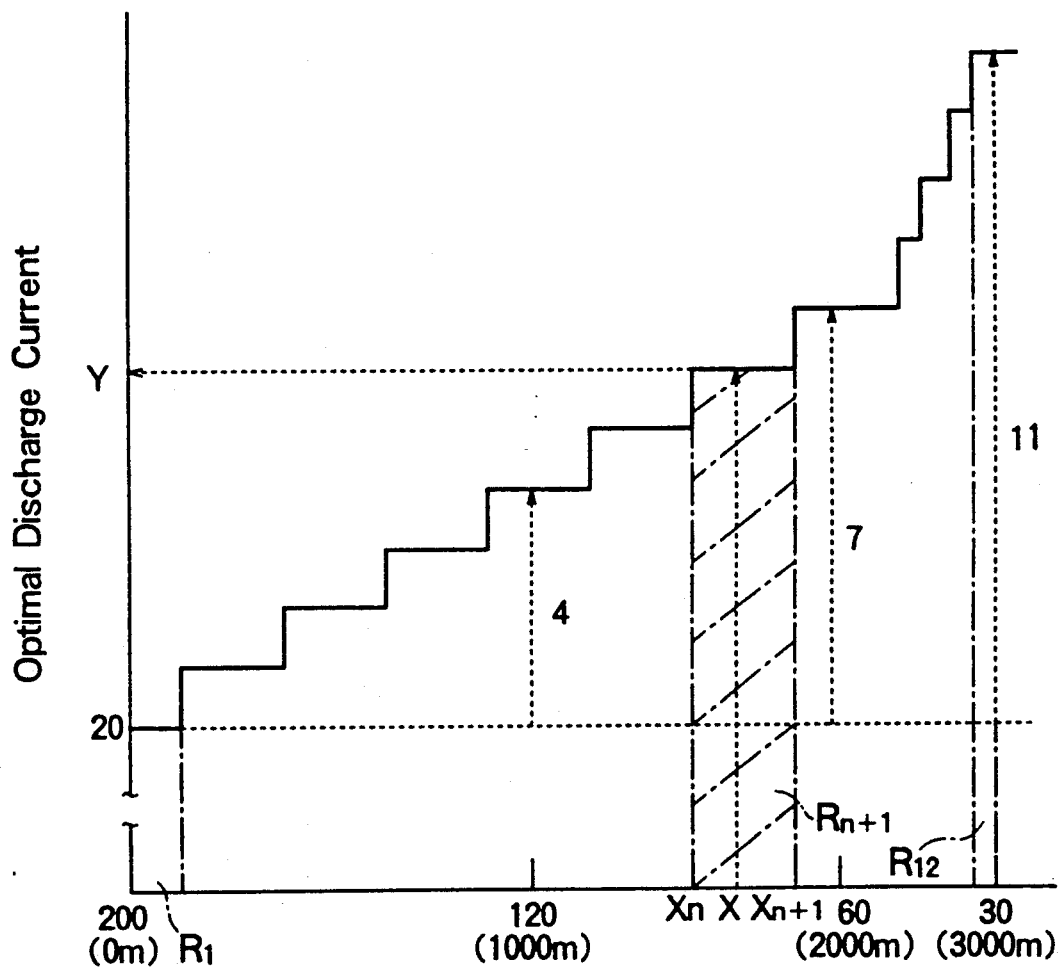
FIG. 6 is a graph plotting a characteristic of optimal discharge current vs. atmospheric pressure data for a number of cores of optical fibers to be fusion spliced.
Figure 7:
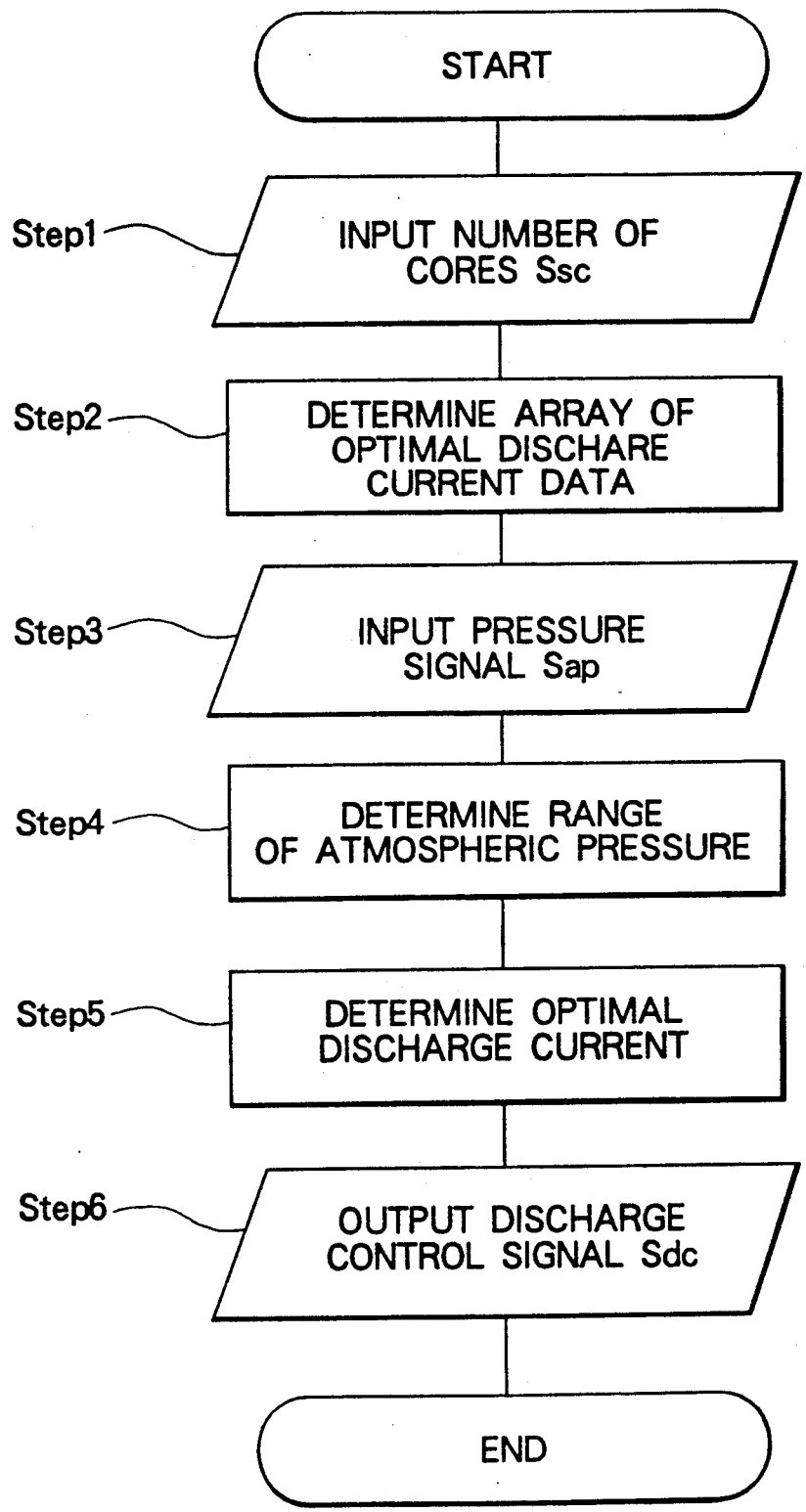
FIG. 7 is a flowchart illustrating operation of a microprocessor unit.

Referring to FIGS. 5 to 7, another embodiment of the present invention will be described. As illustrated in FIG. 5, in the second embodiment, an atmospheric pressure signal Sap and a splice condition signal Ssc are provided to a microprocessor unit 34, where operation is conducted as hereinafter described to produce a control signal Scon for representing an optimum discharge power, discharge current in this embodiment.

According to the control signal Scon, appropriate resistance is selected in a correction amount determining unit 60 for providing a discharge control signal Sdc representing an appropriate correction amount. The correction amount determining unit 60 includes relays and a resistance type voltage divider. A specific configuration of the correction amount determining unit 60 is given in Sato et al U.S. Pat. No. 5,122,638 as reference current signal setting unit. The disclosure of U.S. Pat. No. 5,122,638 is incorporated herein by reference. The correction amount determining unit 60 may be omitted if a digital control signal is directly provided from the MPU 34 to the discharge control unit 22 to determine discharge current in a software manner.

How to produce the control signal Scon will be described. First of all, arrays or tables of numbers of optical fiber cores to be fusion spliced vs. atmospheric pressure for giving optimal discharge current data are experimentally prepared as in Table 1 by the following procedures. Each of the fusion splicers is placed in a pressure chamber, where levels of atmospheric pressure signals Sap are determined at predetermined altitudes as shown as data 1 in Table 2, for example.

TABLE 2

| | Data 1 |
|---|---|
| Altitude(m) | Atmospheric Pressure (analog to digital converted) |
| 0 | 200 |
| 1000 | 120 |
| 2000 | 60 |
| 3000 | 30 |

Then, for each splice mode, optimum discharge currents are determined at the predetermined altitudes, and the resulting data 2 will be given as in Table 3, for example.

TABLE 3

| | Data 2 | |
|---|---|---|
| Altitude(m) | Optimal Current | Difference |
| 0 | 20 | — |
| 1000 | 24 | 4 |
| 2000 | 27 | 7 |
| 3000 | 31 | 11 |

In this embodiment, the splice mode or splice condition signal Ssc indicates the number of cores of the optical fibers to be fusion spliced, but may include information of the kind of optical fibers, such as single mode and multi mode fibers.

On the basis of these data 1 and 2, two-dimensional arrays or tables of data of numbers of optical fiber cores to be fusion spliced vs. atmospheric pressure for giving optimal discharge current data are prepared. FIG. 6 illustrates a graph plotting such an array of data for a number of cores of optical fibers to be fusion spliced. The characteristic of the optimal discharge current vs. atmospheric pressure curve is non-linear. In FIG. 6, atmospheric pressure axis is divided into 12 regions from R1 to R12 by interpolation. These arrays of data are placed as data in a computer program stored in the microprocessor unit 34.

The operation of the microprocessor unit 34 will be described referring to the flowchart in FIG. 7. In the step 1, the number of cores of optical fibers to be fusion spliced is inputted as a splice condition signal Ssc to the microprocessor unit 34 through the input unit 30. Then, the CPU (central processing unit) of the microprocessor unit 34 goes to the step 2, where an array of optimal discharge current data and atmospheric pressure data, the array of FIG. 6, for example, is determined on the basis of the inputted number of the cores. In the step 3, an atmospheric pressure signal Sap(=X) is inputted from the pressure sensor 24 to the CPU. In the step 4, the CPU determines a range of atmospheric pressure, the range satisfying the following equation:

$$X_n \leq X < X_{n+1}$$

where $X_n$ is the lower end value of the range and $X_{n+1}$ is the lower end value of the adjacent higher range $R_{n+2}$. In the step 5, the CPU determines an optimal discharge current Y for the range $R_{n+1}$, and outputs a discharge control signal Sdc representing the optimal discharge current Y.

What is claimed is:

1. A method of fusion splicing optical fibers, comprising the steps of:
   arranging cores of the optical fibers, including ends to be fusion spliced, in such a manner that the ends of the corresponding cores of optical fibers opposingly face to each other between discharge electrodes for fusion splicing;
   automatically adjusting discharge current flowing between the discharge electrodes according to a number of the cores of the optical fibers to substantially provide an optimal correction to the discharge current in relation to the number of the cores of the optical fibers;
   further adjusting the discharge current to a variation in atmospheric pressure to substantially provide an optimal correction to the discharge current in relation to the variation in atmospheric pressure.

2. A method of fusion splicing optical fibers as recited in claim 1, wherein the discharge current is adjusted to a variation in atmospheric pressure in a non-linear manner.

3. A method of fusion splicing optical fibers, comprising the steps of:
   arranging cores of the optical fibers, including ends to be fusion spliced, in such a manner that the ends of the corresponding cores of optical fibers opposingly face to each other between discharge electrodes for fusion splicing;
   inputting an atmospheric pressure signal representing a surrounding atmospheric pressure;
   inputting a splice condition signal representing a number of the cores of the optical fibers; and
   automatically correcting a discharge condition in the discharge electrodes according to both the atmospheric pressure signal and the splice condition signal to substantially provide an optimal correction to the discharges in relation to the atmospheric pressure and the number of the cores of the optical fibers.

4. In a method of fusion splicing optical fibers in which cores of the optical fibers, including ends to be fusion spliced, are arranged in such a manner that the ends of the corresponding cores of optical fibers opposingly face to each other between discharge electrodes for fusion splicing; and the discharge condition of the discharge electrodes is automatically corrected on the basis of an atmospheric pressure signal representing a surrounding atmospheric pressure, the atmospheric pressure signal being provided from an atmospheric pressure sensor, comprising the steps of:
   inputting a splice condition signal representing a number of the cores of the optical fibers; and
   automatically correcting a discharge condition in the discharge electrodes according to the splice condition signal to substantially provide an optimal correction to the discharge in relation to the number of the cores of the optical fibers.

5. A method of fusion splicing optical fibers, comprising the steps of:
   arranging cores of the optical fibers, including ends to be fusion spliced, in such a manner that the ends of the corresponding cores of optical fibers opposingly face to each other between discharge electrodes for fusion splicing;
   inputting a splice condition signal representing a number of the cores of the optical fibers;
   inputting an atmospheric pressure signal representing a surrounding atmospheric pressure;
   automatically adjusting discharge power in the discharge electrodes according to the splice condition signal to substantially provide an optimal correction to the discharge power in relation to the number of the cores of the optical fibers; and
   further adjusting the discharge power to a variation in atmospheric pressure to substantially maintain a constant discharge power in relation to the variation in atmospheric pressure.

6. An optical fiber fusion splicer, comprising:
   atmospheric pressure detection means for detecting a surrounding atmospheric pressure to produce an atmospheric pressure signal representing the surrounding atmospheric pressure;
   inputting means for inputting at least a number of cores of optical fibers to be fusion spliced to provide a splice condition signal representing the number of the cores of the optical fibers;
   discharge control means for controlling discharges between discharge electrodes, the cores of the optical fibers being placed between the discharge electrodes for fusion splicing; and
   data processing means for producing a correction discharge control signal on the basis of both the splice condition signal and the atmospheric pressure signal for substantially performing an optimal correction in the fusion splicing to the discharges, and outputting the correction discharge control signal to the discharge control means.

7. An optical fiber fusion splicer as recited in claim 6, wherein the data processing means comprises:
   atmospheric pressure signal processing means for producing an atmospheric pressure discharge control signal for substantially providing an optimal correction to the discharges in relation to the variation in atmospheric pressure;
   splice condition signal processing means for producing a splice condition discharge control signal for substantially providing an optimal correction to the discharges in relation to the number of the cores of the optical fibers; and
   discharge control signal producing means for producing the correction discharge control signal from both the atmospheric pressure signal processing means and the splice condition signal processing means.

8. An optical fiber fusion splicer as recited in claim 7, wherein the atmospheric pressure signal processing means substantially provides an optimal correction to the discharges in relation to the variation in atmospheric pressure in a non-linear manner.

* * * * *